United States Patent

[11] 3,623,718

| [72] | Inventor | Eugene J. Thomeczek, Sr.<br>Dayton, Ohio |
|---|---|---|
| [21] | Appl. No. | 833,263 |
| [22] | Filed | June 16, 1969 |
| [45] | Patented | Nov. 30, 1971 |
| [73] | Assignee | Northwestern Tools, Inc.<br>Dayton, Ohio |

[54] CLAMP ASSEMBLY
18 Claims, 7 Drawing Figs.

[52] U.S. Cl. .................................................. 269/91,
269/184, 269/215
[51] Int. Cl. .................................................. B23g 3/02
[50] Field of Search .................................................. 269/93, 94,
99, 100, 181, 182, 183, 184, 185, 187, 215, 91,
186, 172; 81/177 G; 248/361 B; 24/243 G, 243 H

[56] References Cited
UNITED STATES PATENTS

| 376,191 | 1/1888 | George | 269/215 X |
| 818,454 | 4/1906 | Krus | 269/182 X |
| 922,336 | 5/1909 | Rivers | 269/184 X |
| 2,218,319 | 10/1940 | Pfauser | 269/182 |
| 2,339,897 | 1/1944 | Wetzler | 269/94 |
| 2,896,985 | 7/1959 | Braatz | 81/177 G |
| 3,220,721 | 11/1965 | Wahli | 269/182 |
| 3,150,870 | 9/1964 | Nelson | 269/91 |

FOREIGN PATENTS

| 1,222,770 | 1960 | France | 269/94 |
| 1,363,642 | 5/1964 | France | 269/91 |

*Primary Examiner*—William S. Lawson
*Attorney*—Jerome P. Bloom

ABSTRACT: A clamping unit of the invention comprises an elongated rodlike rack having at least one longitudinally extended series of slots, the slots being angled generally transverse to and spaced at selected intervals along a portion of the rod length. A clamping bar mounted on and movable along said rack includes means for a releasably fixed engagement thereof with the means defining at least one of said slots.

PATENTED NOV 30 1971
3,623,718
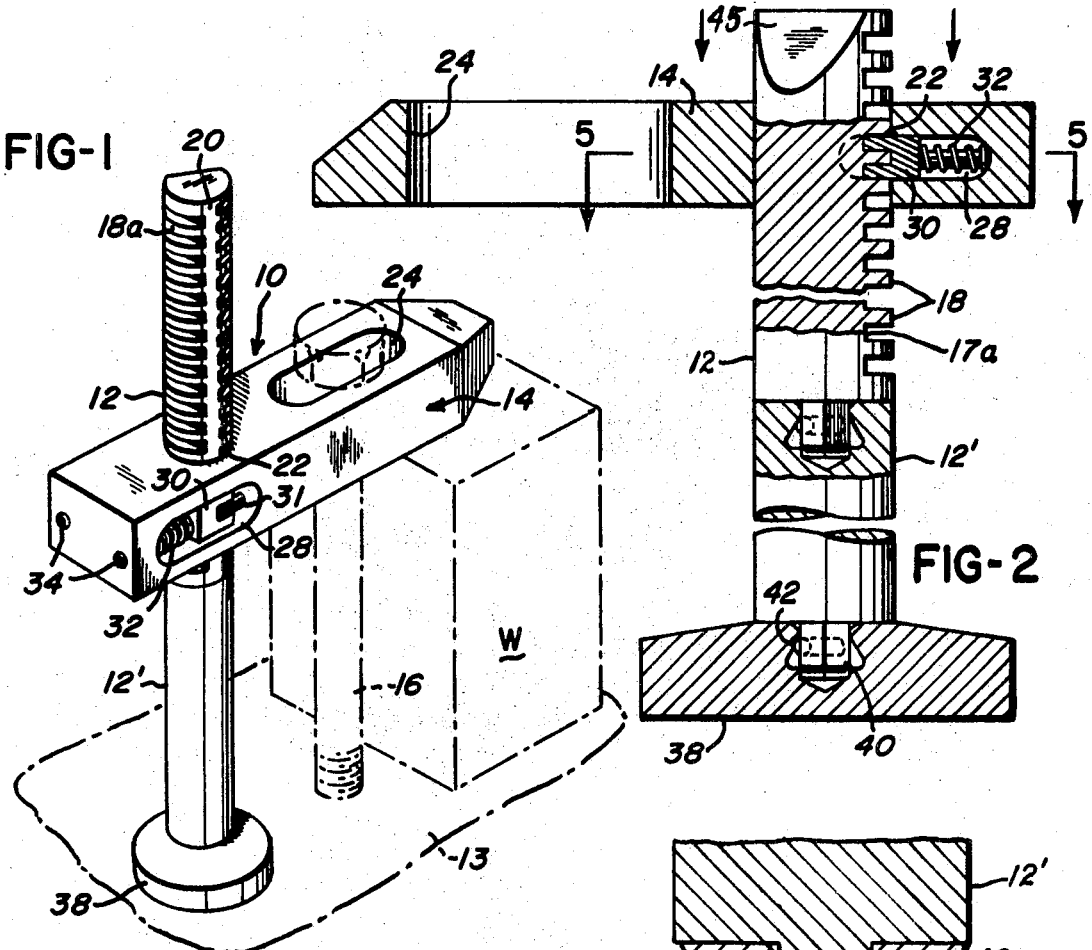
FIG-1
FIG-2
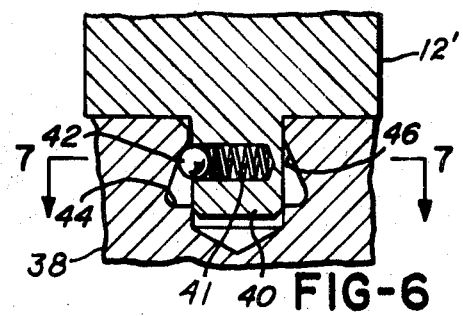
FIG-6
FIG-5
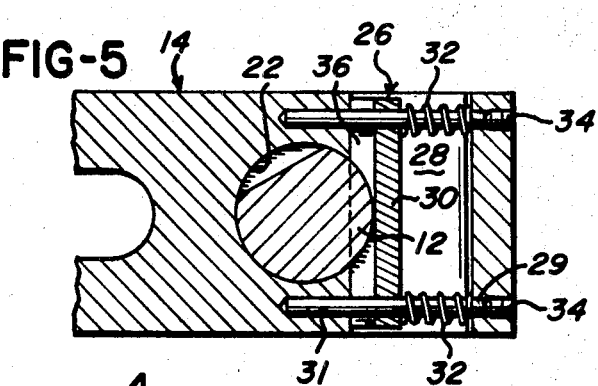
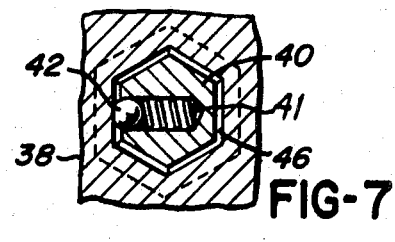
FIG-7
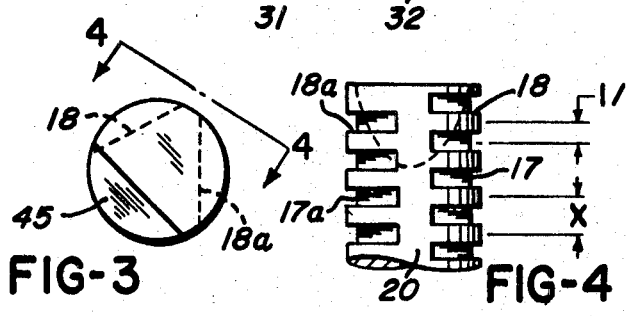
FIG-3
FIG-4
INVENTOR
EUGENE J. THOMECZEK, SR.
BY Jerome P. Bloom
ATTORNEYS

CLAMP ASSEMBLY

BACKGROUND OF THE INVENTION

This invention relates to a clamping mechanism having particular advantage for use in holding a work piece on the work-supporting surface of a machine tool such as a milling machine, boring mill, planer, jig borer, reading or measuring instrument, and other tools of like nature. It will be so illustrated, in a preferred embodiment. However, it should be understood that the novel features herein disclosed can be applied in forms and applications other that that here described without departing from the spirit and scope of the present invention. As will become readily apparent, such features can also be applied, for example, to create an improved vise of a "C" clamp.

It is particularly difficult to hold a work piece of metal rigidly secure during a machining or cutting operation. While the control of machining speeds and machining procedures have substantially improved through the years due to the creation and use of new lubricants, special cutting tools, and free machining additives applied to the work piece, the substantial pressures or forces acting against a work piece during a metal-cutting operation have not been materially reduced. For an effective machining operation it still remains that the work piece must be rigidly clamped, irrespective of its size. Also, the clamping devices previously proposed and used for such applications have exhibited difficulties in their manipulation to fix and to release a work piece, as well as difficulties in their adjustment to accommodate different work pieces. Thus, problems exist which stem from the inflexibility of use, manipulation and application of prior art clamps. This has been particularly evidenced in the nature of the handling required and the time normally consumed in releasing and replacing a work piece. The significant cost factor involved in such a situation is self-evident.

SUMMARY OF THE INVENTION

The present invention not only provides a solution of the problems here posed but does so in an economical and most effective manner, obviating the need for the consideration of complex and expensive quick-release clamp structures to serve the same purpose.

In its preferred embodiment the present invention provides a clamping mechanism which includes an elongate rodlike slotted or notched rack member which rotatably nd slidably mounts a perpendicularly projected clamping bar. The bar has a first aperture at one end to receive therethrough the rack. A second aperture is provided in the clamping bar at right angles to and in communication with the first. This second aperture accommodates therein a spring-biased locking bar mounting lug means, the latter being adapted to project from the second aperture into the first and be induced thereby to selectively engage in the slots of said rack. By such means at this the perpendicularly projected clamping bar may be secured in any selected position of adjustment along the length of the rack.

The slots are cut in the rack in such a manner and the lug means are of such configuration that when it is necessary to release and shift the bar along the rack, one can do so by merely producing a relative rotation of the bar and the rack. This will cause the lug means to automatically disengage from the slotted portions of the rack. The bar is then free to be slid along the rack to a new position of adjustment. Here a further relative rotation of the bar and the rack can result in the lug means automatically engaging in a different slot or slots.

A further feature of the invention resides in the means whereby in certain preferred embodiments a base member or extension may be secured to one end of said rack. In such case the end of the rack is provided with an axially directed multisided male projection containing a laterally projected spring-biased ball-shaped detent. The latter is received in one end of an extension or base provided with a uniquely shaped multisided cavity. The cavity is characterized by sidewall portions which slope away from the opening thereto. By configuring the cavity in such manner, to be further described, an unusually firm connection results in the mere process of inserting the male projection.

It is therefore a primary object of the invention to provide a clamping apparatus which is economical to fabricate, more efficient and satisfactory in use, adaptable to a wide variety of applications and unlikely to malfunction.

Another object of the invention is to provide a clamping apparatus affording an improved and most flexible relation of parts.

A further object of the invention is to provide clamping apparatus including a rodlike member uniquely formed to mount a clamping bar or the like device which may be rotatively displaced thereon to and from a locked position, one which is otherwise frictionally held thereto for sliding adjustment along the rod length.

An additional object of the invention is to provide improved means for clamping a work piece or like object to means defining a supporting surface.

Another object of the invention is to provide a multipart clamp device characterized by means for providing an interconnection of parts which automatically induces an inherent drawing together of parts and inhibits their ready separation.

A further object of the invention is to provide clamping apparatus possessing the advantageous structural features, the inherent meritorious characteristics and the means and mode of use herein described.

With the above and other incidental objects in view as will more fully appear in the specification, the invention intended to be protected by Letters Patent consists of the features of construction, the parts and combinations thereof, and the mode of operation as hereinafter described or illustrated in the accompanying drawings, or their equivalents.

BRIEF DESCRIPTION OF THE DRAWINGS

Referring to the accompanying drawing wherein is shown one but obviously not necessarily the only form of embodiment of the invention, FIG. 1 is a perspective view showing clamping mechanism in accordance with a preferred embodiment of the invention as applied to a work piece supported on a machine table;

FIG. 2 is an enlarged sectional view of the clamping mechanism illustrated in FIG. 1;

FIG. 3 is a top view of the vertically disposed slotted rack component included in the clamping mechanism of FIG. 1;

FIG. 4 is a side view of a fragment of the slotted rack;

FIG. 5 is an enlarged sectional view taken along line 5—5 of FIG. 2;

FIG. 6 is an enlarged sectional view showing a unique connection between the rack and a member joined thereto to form an extension thereof; and FIG. 7 is a sectional view taken along 7—7 of FIG. 6, showing details of the connection.

Like parts are indicated by similar characters of reference throughout the several views.

DETAILED DESCRIPTION OF PREFERRED EMBODIMENT

As seen in the drawings, the clamping apparatus 10 there shown comprises a member 12 of rodlike form and a perpendicularly projected clamping bar 14. In this instance the member 12 mounts perpendicular to the work-supporting surface 13 of a machine tool while the bar 14 is adapted to overlie and clamp to the table 13 a work piece W, for a cutting or like operation.

Consisting the rod 12 in the form illustrated, for the practice of the invention a portion of its length is provided with a series of longitudinally spaced notches or slots 17 which define therebetween teeth 18 and produce thereby a rack. As here illustrated, the teeth are vertically spaced, formed transversely of and project perpendicular to the longitudinal axis of the rack. Moreover, in the preferred embodiment here shown there are two side-by-side vertical rows of slots formed longitudinally of the rod 12. The slots in the one row are designated as 17 and in the other row as 17a. The rows are circumferentially but closely spaced while the slots in the adjacent rows are relatively and uniformly offset in a longitudinal sense. As seen, the slots 17 in one row dispose intermediate the successively adjacent slots 17a in the adjacent row, and vice versa. This arrangement provides that the two rows of slots mutually define a series of circumferentially and longitudinally offset teeth 18 and 18a in the respective rows, which teeth are equidistantly spaced. Between the adjacent rows of slots the exterior cylindrically formed surface of the rod 12 is continuous and unbroken as indicated at 20.

It will be understood in the case illustrated that as between the teeth 18 in one row their centers are spaced, for example, the distance X and therefore the distance between centers of the most adjacent circumferentially spaced teeth 18 and 18a in the adjacent rows is one half X.

More than two rows of slots may be formed in the side of the rod 12 provided, for best usage, the teeth in the successively adjacent rows are longitudinally as well as circumferentially offset.

An aperture 22 in one end of the bar 14 remote from the work piece receives the rod 12 therethrough with a slip fit. The diameter of the aperture 22 and the cross section of the rod 12 are such that while there may be a sliding mount of the one to the other, there is sufficient friction therebetween that the bar will not slide on the surface of the rod under the influence of its own weight. Pressure is required for the relative movement of the parts.

As seen, the bar 14 has a generally rectangular elongate form. At its end remote from that which overlies the work piece W and to the side of aperture 22 most remote from the work piece the bar 14 has a transverse through aperture 28. The latter aperture intersects the aperture 22 intermediate its upper and lower limits referenced to the rod 12 and at right angles to its central axis. Located within the aperture 28 is a rack-engaging mechanism 26 comprising a bar member 30 which is U-shaped in cross section. The member 30 has a length which is approximately the width of the bar 14 and includes in its base portion a pair of transversely spaced apertures. Projected through the latter apertures are a pair of parallel laterally spaced pins 31 extending fore and aft to bridge the length of the aperture 28 and engage at their respective ends in the body of the bar 14. At their inner ends the pins 31 dispose to opposite sides of the aperture 22. Their other ends nest in passages 29 opening from the aperture 28 through the most adjacent end of the bar 14. The pins 31 are in the first place inserted through passages 29 in an obvious manner and when inserted contained longitudinally in place by screws 34 which are threadedly engaged in the passages 29. A coil spring 32 is mounted about each pin 31 to be contained under pressure between the base of the U-shaped bar member 30 and an opposite surface portion of bar 14 defining the outermost end of aperture 28. The net effect is to place springs 32 under compression so as to apply a uniform bias of the member 30 to cause its projected leg portions which define lug means to bear on the facing portion of the rod 12 in the aperture 22.

Referring once more to the rod 12, in the example here shown it mounts to an extension 12' which in turn seats to and projects from a base member 38. While the latter is shown in this instance to have a circular configuration, such configuration is a matter of choice. What is distinctive is the form of the central cavity in its upper surface. The cavity is multisided, the sides being flat and producing a hexagonal cross section to the cavity. The opening to the cavity provides its minimal cross-sectional dimension and from such opening to the base 44 of the cavity its sides diverge preferably at a 30° angle to a vertical. Depending on the application this angle may vary from 25° to 40°. In direct alignment with the opening to the cavity the base 44 thereof has a central recess of matching cross section. At the end thereof which seats to the base portion 44, the rod extension 12' has a male projection 40 of hexagonal cross-sectional configuration formed to slip fit in the cavity in the base member 38. A cylindrical recess inwardly of one flat side of the projection 40 accommodates a coil spring 41 held therein under compression by an abutted ball detent 42. The latter partially projects laterally of the projection 40 and is in turn held from release from the recess by peening in an obvious manner. Accordingly, when the rod extension 12' is to be applied to the base member 38, the projection 40 is simply thrust into the base cavity. As the ball detent encounters the lip of the base cavity and is forced thereby it is readily cammed inwardly of its accommodating recess and against the bias of its backing spring. A unique feature of the connection is that as the ball detent is permitted to move outwardly of its recess by the slope of the cavity walls, such slope exerts a sharp pull down effect on the ball. This results in an inherent quick and firm wedging of the projection 40 into the recess in the cavity base. In the process the rod extension is pulled into a tight and stably mounted engagement with the base member 38 and in a firm vertical relation thereto. Noting FIG. 2, similar means are used to form an interconnection between the rod 12 and its extension 12'.

Referring to FIG. 1 of the drawings, depending on the application the base 38 may or may not be further secured to the table 13. It is shown in FIG. 1 how one may also apply to the clamping bar a T-bolt as a supplemental fixing means. However this is not required. Where one may desire for some reason the application of a T-bolt, between the rod 12 and the work piece bar 14 includes an elongate slot 24. There may be projected through the slot 24 a clamping bolt 16, the head of which abuts the upper surface of the bar and the projected extremity of which may threadedly engage in or through the work table and into a nut (not shown) fixed against rotation at the bottom of the table 13. The slot 24 is not essential to the practice of the invention but is included to demonstrate its use in an application of the bolt 16 as a supplemental fixing device, where base 38 is not secured.

So far in this description nothing has been said in regard to the shape or depth of the notches 17, 17a or the teeth 18, 18a. Common sense dictates that the requirement be that their depth and the nature of the lugs on the U-shaped member 30 be such to insure stability or rigidity of the bar member 14. In the development of the invention, however, it has been found in reference to the preferred embodiment of the invention here illustrated that the radial depth of the slots or notches should in relation to the arcuate length of the rod portion exposed by cutting the slots or notches have, preferably, a ration of 1 to 4 or 5. As will be further described, on relative rotation of the rod 12 and the bar 14, this facilitates a camming of the lug means of member 30 to and from a stable nested relation within aligned notches. This obviates the need for a manual pullback of the member 30 in order to adjust the position of the clamping bar 14 on the rod 12.

Attention is directed to FIG. 2 of the drawing where one may note a slope 45 developed on one end of the rod 12 in an area of the rod where the length of its surface is unbroken. This facilitates an assembly of the rod and the bar 14. When assembly is desired, the sloped end of the rod is easily inserted through the aperture 22 in immediate facing relation to the lug means on the member 30. Since the portion of the rod immediately of the lug means is continuous, as the rod is inserted, it will cam the member 30 from the aperture 22 and into the aperture 28. In the process the springs 32 are compressed and store energy. This being the case, the bar 14 can be pressured to slide along the length of the rod to the approximate position the application of the clamp may require. Then on rotating the bar 14 relative the rod to the point of alignment of member 30 with the rack portion of the rod and suitably adjusting the bar 14 along the rod the lug means will align with spaced notches 17 and be snapped into such notches, under the influence of the springs 32. If the position, noting FIG. 1, is not just right to clamp the work piece, one need only rotate bar 14 again, in the process of which member 30 is cammed back into aperture 28 as its lug means rides up on an unbroken portion of the circumferential extent of the rod. Then by turning the rod 12 and bar 14 suitably and producing longitudinal and relative movement thereof one can cause lug means of member 30 to align with spaced notches 17a or different notches 17, in which event they are snapped in the notches by springs 32. In any case it will be obvious how one can easily achieve a quick and easy adjustment between the bar 14 and rod 12 to precisely position the clamping bar as desired. The engagement of the bar 14 and the rod 12 is such to inhibit vertical displacement of a work piece once clamped. The clamp structure also inhibits inadvertent lateral displacement of the bar 14. It takes a firm and positive application of force to effect a rotation of bar 14.

The facility with which the invention apparatus may be assembled, applied and adjusted to meet changing needs should now be obvious. Moreover, the simplicity of its fabrication makes it readily apparent that one would need no special knowledge or degree of adeptness to quickly master its use. The attendant benefits previously noted become self evident.

From the above description it will be apparent that there is thus provided a device of the character described possessing the particular features of advantage before enumerated as desirable, but which obviously is susceptible of modification in its form, proportions, detail construction and arrangement of parts without departing from the principle involved or sacrificing any of its advantages.

While in order to comply with the statute the invention has been described in language more or less specific as to structural features, it is to be understood that the invention is not limited to the specific features shown, but that the means and construction herein disclosed comprise but one of several modes of putting the invention into effect, and the invention is therefore claimed in any of its forms or modifications within the legitimate and valid scope of the appended claims.

Having thus described my invention, I claim:

1. Clamp apparatus comprising one portion of generally rodlike configuration, a clamping portion mounting on said rodlike portion to project therefrom in a lateral sense and achieve selective positions of adjustment, said clamping portion having a frictional mount to said rodlike portion and being slidable thereon to and from an opposed reference surface, and there being means for automatically effecting an interlock between said clamping portion and said rodlike portion responsive to their achieving selected relative positions of adjustment.

2. Apparatus as in claim 1 characterized by said rodlike portion having formed therein a series of longitudinally spaced recesses, and there being, in connection with said clamping portion, means for engaging in said recesses in automatic response to an exposure thereto whereby to achieve said interlock which inhibits an inadvertent displacement of the so set position of said clamping and rodlike portions.

3. Apparatus as in claim 2 wherein said rodlike portion includes recesses which are both longitudinally and circumferentially spaced and said rodlike and said clamping portions may be relatively rotated to achieve any one of a plurality of set positions as dictated by the placement of said recesses.

4. Apparatus as in claim 1 characterized by said clamping portion having a bar form and an aperture in one end through which slidably projects said rodlike portion, said clamping bar being slidable along and rotatable on said rodlike portion, and means for achieving said automatic interlock being projectable to engage said rodlike portion within said aperture.

5. Apparatus as in claim 4 characterized by said rodlike portion having recesses which are uniformly spaced along at least a portion of its length to selectively receive therein said projectable means to achieve said automatic interlock.

6. A clamping device according to claim 1 wherein said rodlike portion has an elongate form and the exterior surface thereof includes a. at least one series of slots angled transverse to the axis of said rodlike portion and spaced at intervals along a portion of the axial length thereof; and said clamping portion includes b. a clamping bar having a first aperture therein for mounting thereof to said rodlike portion, and a second aperture perpendicular to and communicating with said first aperture; and there being c. means within said second aperture for movement therefrom into said first aperture, whereby when said rodlike portion is mounted in said first aperture, said means may be caused to engage at least one of said slots to achieve said interlock.

7. The clamping device according to claim 6 wherein said rodlike portion is provided with a plurality of slots aligned in one or more series along the axial length thereof, each series of slots being circumferentially spaced from any other to expose an uninterrupted surface of said rodlike portion therebetween for said bar to be slid thereon in bearing relation to said rodlike portion.

8. The clamping device according to claim 6 wherein said means in said second aperture comprises a spring-biased bar including lug means for engagement with said slots.

9. Clamping apparatus as in claim 1 wherein said portions are rotatable, one relative the other, and there are means defining fixing stations for said clamping portion spaced longitudinally of said rodlike portion, said automatic means being arranged to function on a selected positioning of said clamping portion at a selected station on said rodlike portion.

10. Apparatus as in claim 9 characterized by said rodlike portion having surface portions for inducing a release of said automatic functioning means on application of a predetermined rotative influence to move one of said portions relative the other.

11. Apparatus as in claim 9 characterized by said stations being established in a precision spaced relation to enable, on selected increments of relative rotation of said portions, a predetermined setting and adjustment of said clamping portion.

12. Clamping apparatus, including a rod member, a clamp member mounted on and projecting laterally of said rod member, said clamp member being variable positionable along a length of said rod member, means applying a continuing action to automatically interlock said clamp member to said rod member in selected positions of adjustment, and means utilizing rotary movement of said member to enable and disable said last-named means.

13. Clamping apparatus accounting to claim 12, wherein said rod member has a slotted peripheral portion of longitudinal extent, said interlocking action being applied by spring-biased lug means carried by said clamp member to bear against said rod member, rotary movement of said rod member aligning and misaligning said slotted portion relative to said lug means, the said slotted portion of said rod member and unslotted peripheral portions thereof being interconnected to facilitate by a camming action engagement and disengagement of said lug means relative to slots in said slotted portion in response to rotary turning movement of said rod member.

14. Clamping apparatus according to claim 13, wherein the slotted peripheral portion of said rod member comprises at least one series of slots angled transverse to the axis of said rod member and spaced at intervals along a length thereof, an unslotted peripheral portion disposing in side-by-side relation to said series of slots, rotary adjustment of said rod member selectively positioning said series of slots or said unslotted portion in cooperative relation with said lug means.

15. Clamping apparatus according to claim 14, characterized by a second longitudinal series of transverse slots formed in said rod member on the opposite side of said unslotted peripheral portion, the slots of said second series being in a longitudinal offset relation to the slots of the first said series, said rod member having an intermediate position of rotary adjustment wherein said lug means bears against the unslotted portion, thereof and being rotatively adjustable in either direction therefrom to place either the first said series of slots or the second said series of slots into cooperative relation with said lug means.

16. Clamping apparatus according to claim 12, wherein said clamp member has apertures in intersecting perpendicular relation to one another, said rod member being slidable in one of said apertures and projecting a peripheral portion thereof into the other one of said apertures, said interlocking action being applied by lug means slidable in the said other one of said apertures in a sense perpendicular to the axis of said rod member, means continuously biasing said lug means to bear against the projecting periphery of said rod member, and at least one longitudinal series of slots formed in a peripheral portion of said rod member flanked to at least one side by an unslotted peripheral portion continuous over the length of said series of slots, said lug means interengaging in said slots to fix longitudinal positions of adjustment of said clamp member on said rod member, said rod member being rotatively adjustable alternatively to align said series of slots and said unslotted portion with said lug means and being formed to effect in conjunction with a rotary adjustment to misalign the said series of slots a disengagement of said lug means therefrom whereby to release said clamp member for selective longitudinal adjustment.

17. Clamp apparatus according to claim 16, characterized by another longitudinal series of slots, said one series and said other series being circumferentially spaced from one another to either side of said unslotted portion, corresponding slots of said series being relatively offset in a longitudinal sense.

18. Clamp apparatus according to claim 17, wherein radial centers of said series of slots are circumferentially spaced apart a distance less than 180° and are separated by two unslotted portions of differential circumferential area, one end of said rod member having a bevel formation aligning with the unslotted portion of larger area to facilitate a slip fit entry of said rod member into said one aperture in said clamp member in the course of which entry said lug means is cammed out of the path of said end and rides an unslotted portion of said rod member until a selected relative longitudinal position of adjustment of said rod member and said clamp member is reached whereupon said rod member is rotated in a selected direction to align a selected series of slots with said lug means, said lug means making an automatic engagement therewith.

* * * * *

UNITED STATES PATENT OFFICE
CERTIFICATE OF CORRECTION

Patent No. 3,623,718                    Dated November 13, 1971

Inventor(s) Eugene J. Thomeczek, Sr.

It is certified that error appears in the above-identified patent and that said Letters Patent are hereby corrected as shown below:

Column 1, line 47, "nd" is amended to read -- and --;

Column 1, line 55, "at" is amended to read -- as --.

Column 2, line 69, "Consisting" is amended to read --
          -- Considering --.

Column 4, line 48, "ration" is amended to read -- ratio --.

Claim 1, line 7 thereof, following "means", --
          -- independent of the reference surface,
             interrelated to said clamping portion
             and said rod like portion, -- has been added.

Signed and sealed this 20th day of June 1972.

(SEAL)
Attest:

EDWARD M. FLETCHER, JR.                 ROBERT GOTTSCHALK
Attesting Officer                       Commissioner of Patents